United States Patent [19]
Murakami et al.

[11] 3,872,358
[45] Mar. 18, 1975

[54] SOLID ELECTROLYTIC CAPACITOR AND SOLID ELECTROLYTE THEREFOR

[75] Inventors: Mutsuaki Murakami; Susumu Yoshimura, both of Kawasaki, Japan

[73] Assignee: Matsushita Electric Industrial Company, Osaka, Japan

[22] Filed: June 11, 1973

[21] Appl. No.: 368,488

[30] Foreign Application Priority Data
June 13, 1972 Japan.............................. 47-58881

[52] U.S. Cl................................. 317/230, 252/62.2
[51] Int. Cl............................................. H01g 9/05
[58] Field of Search..................... 252/62.2; 317/230

[56] References Cited
UNITED STATES PATENTS
| | | | |
|---|---|---|---|
| 3,214,648 | 10/1965 | Ross et al. | 317/230 |
| 3,214,650 | 10/1965 | Ross et al. | 317/230 |
| 3,227,984 | 1/1966 | Halliday | 252/62.2 X |
| 3,483,438 | 12/1969 | Sharbaugh | 317/230 |
| 3,679,944 | 7/1972 | Yoshimura et al. | 317/230 |
| 3,709,820 | 1/1973 | Yoshimura et al. | 317/230 X |
| 3,709,821 | 1/1973 | Yoshimura | 317/230 |

Primary Examiner—Rudolph V. Rolinec
Assistant Examiner—William D. Larkins

[57] ABSTRACT

A solid electrolyte comprising a 7,7,8,8-tetracyanoquinodimethane-base charge transfer complex which contains a quaternary nitrogen-containing heterocyclic compound, the hydrogen at N-position of the heterocyclic compound being substituted by an alkyl group, an alkylene group or a cycloalkyl group. The electrolyte may further comprise a minor amount of a polymer for improving a film-forming property of the charge transfer complex and adherence of the complex to electrodes solid electrolytic capacitors using the above-mentioned complex are also disclosed.

7 Claims, 5 Drawing Figures

SOLID ELECTROLYTIC CAPACITOR AND SOLID ELECTROLYTE THEREFOR

This invention relates to a solid electrolytic capacitors, and more particularly to an improved solid electrolyte therefor.

As is well known in the art, many electrolytic capacitors usually employ film-forming metals (valve metals) including aluminium, tantalum, and the like metals which can form on the surface thereof by anodization a very thin oxide film having excellent dielectric characteristics. The dielectric oxide film, however, inevitably has various kinds of defects or pores which are formed during or after an anodization process, thus resulting in a degradation in electric properties, such as the leakage current, dielectric characteristics and the like, of the capacitors. Accordingly, an electrolyte which intervenes between the oxide film and a counter electrode should anodically oxidize the film during operation as well as should act as a true cathode. Moreover, the electrolyte is essentially required to have a high electric conductivity which is an important factor in producing excellent electrolytic capacitors.

Various solid electrolytes using organic semiconductive materials have heretofore been known. For example, 7,7,8,8-tetracyanoquinodimethane and a salt of 7,7,8,8-tetracyanoquinodimethane (both of which are hereinafter referred to simply as TCNQ and a salt of TCNQ or TCNQ salt, respectively, for the sake of brevity) are well known because of their low resistivity and have proved useful in a solid electrolyte for their remarkable ionic conductivity and high oxidizability.

TCNQ and its various salts and methods of preparation are, for example, described in Journal of American Chemical Society, 84, 3370 (1962), and Canadian Journal of Chemistry, 43, 1488 (1965), and in U.S. Pat. No. 3,115,505.

TCNQ salts may be either simple salts of TCNQ expressed by the following formula wherein M is a metallic or organic cation and $n$ is the valence of the cation, or complex salts represented by the following formula wherein M and $n$ have the same meanings as mentioned above and $m$ is a mole number of neutral TCNQ contained in one mole of the complex salt. The complex salts have generally not only a high conductivity but also an ability of reforming an oxide film on the anode. In particular, the complex salts which have, as a cation, a quaternary nitrogen-containing heterocyclic compound having, for example, a pyridinium ring, quinolinium ring or the like and which have TCNQ as an anion, exhibit an extremely high electric conductivity, e.g., a (pyridinium)$^+$(TCNQ)$^-$(TCNQ) complex salt has a specific resistivity of 37Ω-cm, and (quinolinium)$^+$(TCNQ)$^+$(TCNQ) a specific resistivity of 0.4Ω-cm, thus being considered most suitable for use as a solid electrolyte. The use of these complex salts as an electrolyte is described in U.S. Pat. Nos. 3,181,971, 3,214,650 and 3,483,438.

These complex salts have however disadvantages that they lack in thermal stability, i.e., (quinolinium)$^+$(TCNQ)$^-$(TCNQ) and (pyridinium)$^+$(TCNQ)$^-$(TCNQ) lose their high conductivities at about 100° C and 110° C, respectively. Accordingly, it is highly desired to improve the thermal stability of the complex salts which are used as an electrolyte.

It is therefore an object of the invention to provide a solid electrolyte which is thermally stable up to or about 150° C.

It is a further object of the invention to provide a solid electrolyte a resistivity of which hardly changes over a thermally stable range thereof.

It is another object of the invention to provide a solid electrolyte of an organic semiconductive material which is composed of TCNQ and a quaternary nitrogen-containing heterocyclic compound, the heterocyclic compound having at N-position a substituent instead of hydrogen.

It is another object of the invention to provide a solid electrolytic capacitor including a TCNQ-base charge transfer complex salt of the composition as mentioned above.

Other objects and advantages of the invention will become apparent from the following description and appended claims.

In accordance with the present invention, there is provided a solid electrolyte which comprises a charge transfer complex composed of TCNQ and a quaternary nitrogen-containing heterocyclic compound, the hydrogen at N-position of the heterocyclic compound being substituted by an alkyl group, an alkylene group or a cycloalkyl group. The solid electrolyte may further comprise a minor amount of polymer for improving the film-forming property of the charge transfer complex and the adherence of the complex to electrodes, when applied to capacitors.

The invention will be better understood from the following description taken in conjunction with the accompanying drawings in which.

In order to grasp mechanisms of thermal stability of a known complex salt, (quinolinium)$^+$(TCNQ)$^-$(TCNQ), the present inventor conducted a test to determine the resistivity of the complex salt at different temperatures. This is particularly shown in FIG. 1.

Figure 1:
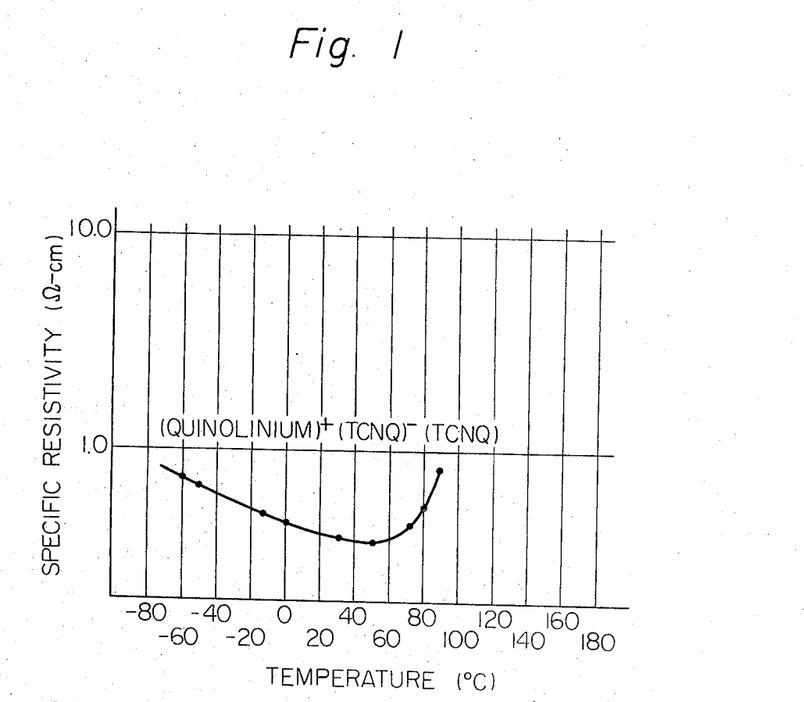
FIG. 1 is a graphic illustration showing the relation between resistivity and temperature in a known charge transfer complex salt.

When the charge transfer complex was heated at a temperature higher than a certain point, the resistivity of the complex abruptly increased in an irreversible manner. The temperature corresponding to the point was considered as a critical thermally stable point. Then, two complex salt specimens, one with and the other without the thermal treatment at a temperature beyond the critical thermally stable point, were subjected to tests including an elementary analysis, ultraviolet and visible light inspections, etc., for investigating differences in structure between the two complex salt specimens.

Test results are summarized as follows:

1. The (quinolinium)$^+$(TCNQ)$^-$(TCNQ) complex salt, when heated, irreversibly loses it high electric conductivity in the vicinity of 80° C.

2. The elementary analysis revealed that the complex salt which had lost its electric conductivity due to the thermal treatment contained a reduced amount of hydrogen.

3. When a pressed sample of the complex salt was heated at a temperature of 100° C to 120° C, yellow powder appeared on the surface thereof. The powder was determined as free TCNQ by the elementary analysis.

4. Even when a resistivity of the complex salt was measured by a 4-probe method (which can completely avoid the reaction of the complex salt with electrodes), the resistivity also disadvantageously increased or deteriorated in the vicinity of 80° C.

Gathering from the above test results, it is considered that the deterioration in resistivity occurs in a manner as follows: the hydrogen atom at N-position of the quinolinium salt is released by thermal decomposition, and free TCNQ is separated from the complex salt, thus resulting in degradation in resistivity.

The present inventor further conducted intensive studies on TCNQ-base complex salts and found that when the hydrogen at the N-position is replaced by a suitable substituent group, the thermal decomposition of the complex salt can be well prevented at least up to 150° C.

According to the present invention, there is provided a solid electrolyte comprising a charge transfer complex which is composed of 7,7,8,8-tetracyanoquinodimethane and a quaternary nitrogen-containing heterocyclic compound, the hydrogen at N-position of the heterocyclic compound being substituted by an alkyl group, an alkylene group or a cycloalkyl group.

The alkyl group to be used in the present invention contains from one to 18 carbon atoms, including methyl ethyl, n-propyl, iso-propyl, n-butyl, tertbutyl, n-pentyl and its isomers, n-hexyl and its isomers, n-heptyl and its isomers, n-octyl and its isomers, etc. The alkylene group contains from two to 18 carbon atoms, such as ethylene, propene, etc., and the cycloalkyl group from five to eight carbon atoms such as cyclopentyl, cyclohexyl, etc.

The charge transfer complex salt useful in the present invention may be a normal salt in which the mole number of free TCNQ contained in 1 mole of the complex salt is 1, or may be an abnormal salt wherein the mole number of free TCNQ contained in 1 mole of the complex salt is deviated from 1. The abnormal salt is more suitable for use as a solid electrolyte since the same has a resistivity which hardly changes in dependence upon temperature, when compared with a normal complex salt.

Typical examples of the abnormal salts are
(N-methyl quinolinium)$^+$(TCNQ)$^-$(TCNQ)$_{0.6}$,
(N-ethyl quinolinium)$^+$(TCNQ)$^-$(TCNQ)$_{0.8}$,
(N-n-propyl quinolinium)$^+$(TCNQ)$^-$(TCNQ)$_{0.9}$,
(N-iso-propyl quinolinium)$^+$(TCNQ)$^-$(TCNQ)$_{1.2}$,
(N-tert-butyl)$^+$(TCNQ)$^-$(TCNQ)$_{2.1}$,
(N-methyl pyridinium)$^+$(TCNQ)$^-$(TCNQ)$_{1.1}$,
(N-ethyl pyridinium)$^+$(TCNQ)$^-$(TCNQ)$_{0.9}$,
(N-n-propyl pryridinium)$^+$(TCNQ)$^-$(TCNQ)$_{1.6}$,
(N-tert-butyl pyridinium)$^+$(TCNQ)$^-$(TCNQ)$_{1.2}$, etc.

The complex salts of the present invention can readily be prepared by reacting iodized N-substituent- and nitrogen-containing heterocyclic coumpund with TCNQ in a solvent, compound allowing the reaction solution to stand for a certain period of time for forming a crystal of a charge transfer complex salt. By suitably selecting the solvent to be used, either a normal salt or an abnormal salt may be obtained. For example, if dichloromethane is used as a solvent, a normal salt can be obtained, whereas if acetonitrile is used, an abnormal salt can be obtained.

In order to improve a film-forming property of the charge transfer complex as an electrolyte, a polymer which is capable of dissolving or dispersing the complex salt may be added to the salt in a minor amount. The polymer useful in the present invention is selected from a polymer of acrylonitrile, methacrylonitrile and vinylpyridine, copolymers of these compounds with each other or with other polymerizable monomers, polymeric urethane, a polyamide such as 6-nylon, polyrrolidone, or the like, a cellulose derivative such as cellulose acetate, cellulose propionate, cellulose butylate or the like, a polyvinyl resin such as polyvinylacetate, polyvinylchloride, or the like, a synthetic rubber such as polybutadiene, polychloroprene or the like, and so on.

Where the polymer is used in combination with the complex salt, the content of the polymer salt is preferred to be within a range of from 1 to 20 percent by weight, preferably from 2 to 10 percent and particularly about 5 percent.

Figure 2:
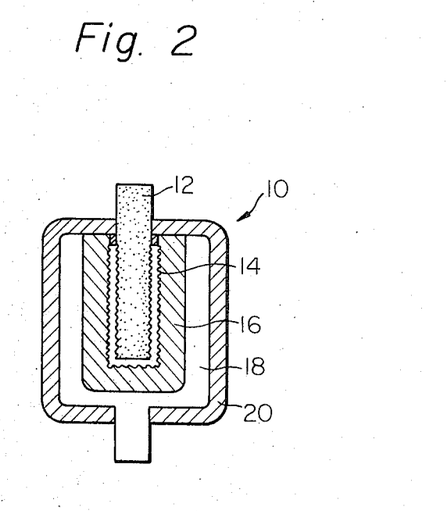
FIG. 2 is a vertical cross-section of a solid electrolytic capacitor constructed in accordance with the present invention.

In FIG. 2, there is shown a preferred embodiment of a capacitor constructed in accordance with the present invention. The capacitor 10 has an anode 12 formed from a valve metal the surface of which is pre-treated by a suitable means and then anodized in an electrolytic solution such as an aqueous solution or an ethylene glycol solution containing ammonium borate, ammonium citrate, ammonium tartrate or ammonium phosphate solution, thereby to form an oxide dielectric layer 14 on the metal surface. The charge transfer complex is applied by immersing or dipping the anode 12 in a solution of the complex salt dissolved in an organic solvent. Then, the organic solvent is evaporated to form a solid electrolyte 16 which is intimately contacted with a cathode 18. The entire unit is encased in a capacitor container 20.

It should be noted that any of anodes such as a porous sintered anode, foil or wire anode may be employed advantageously in the present invention. Furthermore, the electrodes of the capacitors are of any of the normally utilized metals such as aluminium, tantalum or any of other valve metals.

The present invention is particularly illustrated in the following examples wherein the first three examples are directed to charge transfer complexes per se for use as an electrolyte and the last two examples to an electrolytic capacitors using charge transfer complexes of the invention.

EXAMPLE 1

15 millimoles (3.0 g) of TCNQ were dissolved in 1,300 ml of dichloromethane under reflux. Then, 7.5 millimoles (2.0 g) of iodized N-ethyl quinolinium which were dissolved in 200 ml of dichloromethane were added to the TCNQ solution. The resultant solution was allowed to stand for several hours at room temperature thereby to obtain a crystal. The thus obtained crystal was filtered and then washed with dichloromethane until the filtrate became green. The thus washed crystal was further washed with ethyl ether until the filtrate became colorless, to obtain (N-ethyl quinolinium)$^+$(TCNQ)$^-$(TCNQ) to be used as a solid electrolyte. Then, the thus obtained complex salt was powdered in a mortar and the powdered salt was molded into rods each having a diameter of 3 mm and length of 15 mm. One of the rods was used for determining the resistivity at 25° C and thermal stability thereof by a four-probe method using Ag-paste electrodes. Furthermore, another rod was used for comparing an oxide film-reforming ability of the complex salt with that of known (quinolinium)$^+$(TCNQ)$^-$(TCNQ) in a similar rod from, e.g., the rods of the two kinds of the complex salts were subjected to a test wherein surface washed aluminium needless having a purity of 99.999 percent were used for imposing electric current on the respective salt rods to determine the current reducing ratios thereof.

The above process and tests were repeated except that several kinds of other iodized N-alkyl quinolinium were used instead of N-ethyl quinolinium.

The charge transfer complexes thus obtained were a normal salt which contained 1 mole of neutral TCNQ per mole of the charge transfer complex.

Test results are shown in Table 1 below, wherein a specific resistivity and thermal stability of known (quinolinium)$^+$(TCNQ)$^-$(TCNQ) are also shown for comparative purpose.

Table 1

| N-substituent | Specific Resistivity $\rho(\Omega\text{-cm})$ | Thermally-Stable Critical Point (°C) | Anodizability (ratio to anodizability of (quinolinium)$^+$ (TCNQ)$^-$(TCNQ) |
|---|---|---|---|
| Hydrogen | 0.4 | 100 | 1 |
| Methyl | 2000.0 | 150 | 10 |
| Ethyl | 16.6 | 150 | 0.5 |
| n-propyl | 3.0 | 150 | 1 |
| iso-propyl | 1.4 | 150 | 1.3 |
| tert-butyl | 0.4 | 150 | 2.5 |

Figure 3:
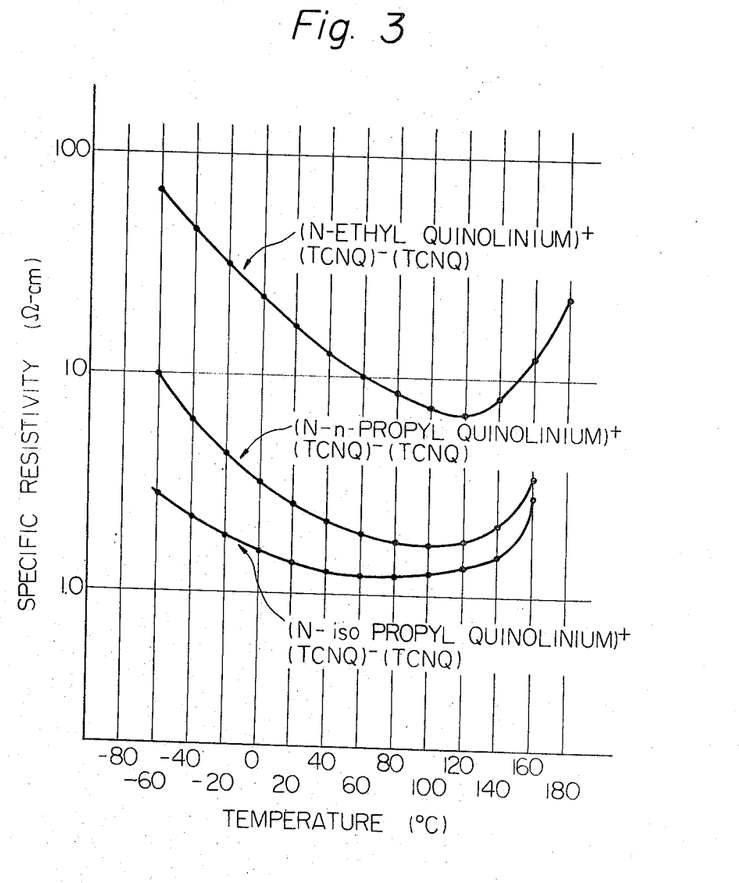
FIGS. 3, 4 and 5 are graphic illustrations similar to that of FIG. 1, respectively, but showing characteristics of charge transfer complex salts of the invention as used as a solid electrolyte.

In FIG. 3, there are shown curves illustrating the relation between specific resistivity and temperature for (N-ethyl quinolinium)$^+$(TCNQ)$^-$(TCNQ), (N-n-propyl quinolinium)$^+$(TCNQ)$^-$(TCNQ), and (N-iso-propyl quinoli quinolinium)$^+$(TCNQ)$^-$(TCNQ).

As is apparent from the Table and FIG. 2, all of the (N-alkyl quinolinium)$^+$(TCNQ)$^-$(TCNQ) are superior in thermal stability to (quinolinium)$^+$(TCNQ)$^-$(TCNQ). The resistivity of the (N-alkyl quinolinium)$^+$(TCNQ)$^-$(TCNQ) tends to decrease with an increase in number of carbon atoms of the alkyl group.

EXAMPLE 2

The process and test of Example 1 were repeated except that acetonitrile was used instead of dichloromethane.

Test results are shown in Table 2 below.

Table 2

| N-substituent | Mole Number of neutral TCNQ contained in 1 mole of Complex salt | Specific Resistivity $\rho$ ($\Omega$-cm) | Thermally-Stable Critical Point (°C) | Anodizability (ratio to anodizability of (quinolinium)$^+$ (TCNQ)$^-$(TCNQ)) |
|---|---|---|---|---|
| Hydrogen | 1 | 0.4 | 100 | 1 |
| Methyl | 0.6 | 3000 | 150 | 20 |
| Ethyl | 0.8 | 30.0 | 150 | 0.8 |
| n-propyl | 0.9 | 3.2 | 150 | 1.7 |
| iso-propyl | 1.2 | 0.7 | 150 | 2.1 |
| tert-butyl | 2.1 | 0.4 | 150 | 3.5 |

When acetonitrile was used as a solvent, all the complex salts obtained were abnormal salts. Moreover, a mole number of neutral TCNQ which was contained per mole of the complex salt varied depending upon the kinds of the alkyl group used. The mole number increases with an increase in number of carbon atoms of the alkyl group.

Figure 4:
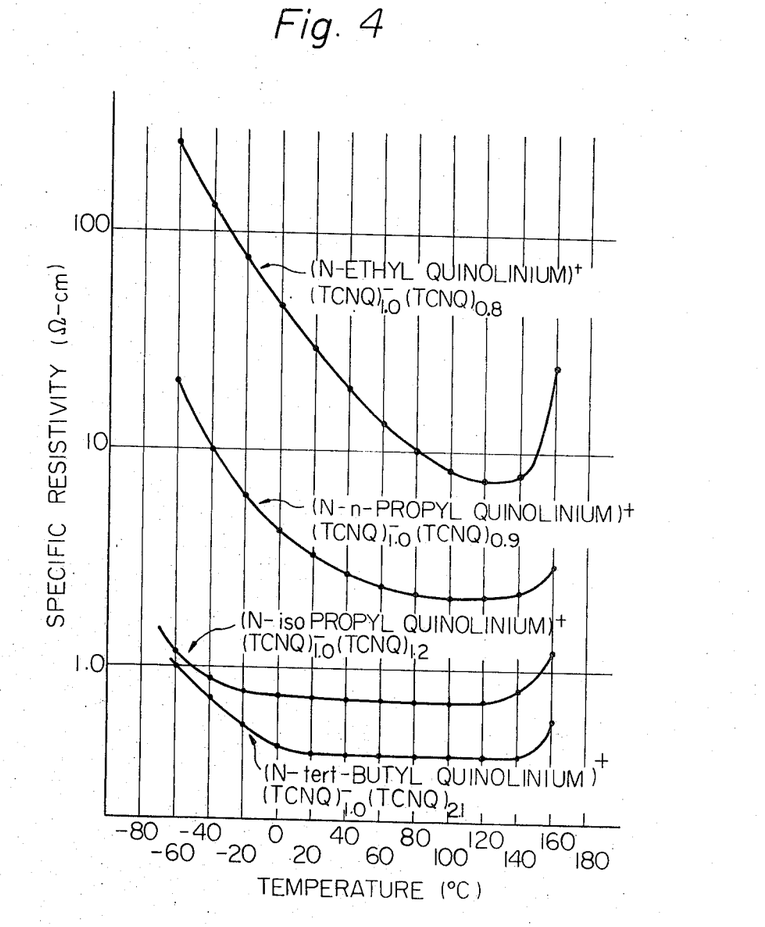

As is apparent from Table 2, all the abnormal charge transfer complexes have remarkably improved thermal stability. Moreover, the specific resistivity of the abnormal complexes except for the methylsubstituted salt is maintained almost constant over a wide range of temperature. This is clearly shown in FIG. 4. In particular, both (iso-propyl quinolinium)$^+$(TCNQ)$^-$(TCNQ)$_{1.2}$ and (tert-butyl quinolinium)$^+$(TCNQ)$^-$(TCNQ)$_{2.1}$ are excellent in specific resistivity and hardly vary depending upon temperature within a certain range, e.g., the former has a small and almost constant specific resistivity at temperatures of 0° to 130° C and the latter at temperatures of 20° to 140° C, thus both being considered excellent as electric conductive materials.

EXAMPLE 3

Example 1 was repeated except that several different kinds of iodized N-alkyl pyridinium were used instead of N-ethyl quinolinium and acetonitrile was used as a solvent, thereby to obtain several kinds of (N-alkyl pyridinium)$^+$(TCNQ)$^-$(TCNQ)$_m$ wherein m has the same meaning as indicated hereinbefore. The thus obtained several kinds of (N-alkyl pyridinium)$^+$(TCNQ)$^-$(TCNQ)$_m$ were subjected to test for determining resistivity, thermal stability and anodizability. For comparison, (pyridinium)$^+$(TCNQ)$^-$(TCNQ)$_{1.2}$ was also subjected to the same tests.

Test results are shown in Table 3 below.

Table 3

| N-substituent | Mole Number of neutral TCNQ contained in 1 mole of Complex salt | Specific Resistivity $\rho$ ($\Omega$-cm) | Thermally-Stable Critical Point (°C) | Anodizability (ratio to anodizability of (quinolinium)$^+$ (TCNQ)$^-$(TCNQ)) |
|---|---|---|---|---|
| Hydrogen | 1.2 | 37 | 110 | 2.0 |
| Methyl | 1.1 | 2600 | 160 | 0.5 |
| Ethyl | 0.9 | 2900 | 160 | 0.7 |

Table 3—Continued

| N-substituent | Mole Number of neutral TCNQ contained in 1 mole of Complex salt | Specific Resistivity $\rho$ ($\Omega$-cm) | Thermally-Stable Critical Point (°C) | Anodizability (ratio to anodizability of (quinolinium)$^+$ (TCNQ)$^-$(TCNQ)) |
|---|---|---|---|---|
| n-propyl | 1.0 | 2300 | 160 | 0.9 |
|  | 1.6 | 1.4 | 150 | 3.8 |
| iso-propyl | 1.0 | 41 | 150 | 1.7 |
| tert-butyl | 1.2 | 35 | 150 | 2.0 |

Figure 5:
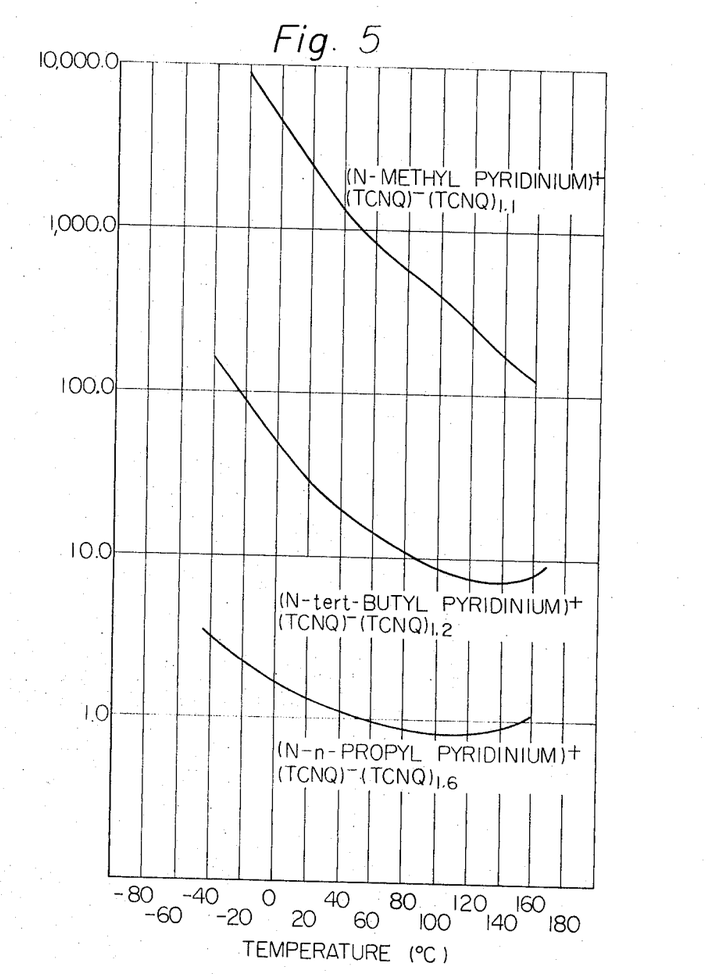

As is apparent from the Table, abnormal complex salts are also obtained in the same manner as in Example 2 since acetonitrile is used as a solvent. With (N-n-propyl pyridinium)$^+$(TCNQ)$^-$(TCNQ)$_m$, there are obtained two kinds of crystals containing different molar amounts of neutral TCNQ, e.g., $m = 1.0$ and 1.6, respectively. The resistivities of (N-n-propyl pyridinium) salts containing different amounts of free TCNQ are greatly different from each other. All of the N-alkyl pyridinium-TCNQ complex salts are thermally stable at least up to 150° C. The relation between specific resistivity and temperature of several kinds of N-alkyl pyridinium-TCNQ complex salts is shown in FIG. 5.

EXAMPLE 4

(N-iso-propyl quinolinium)$^+$(TCNQ)$^-$(TCNQ) of Example 1 was mixed with polyacrilonitrile in a weight ratio of 1/20 of the complex salt. Then the mixture was dissolved in dimethylformamide. The resultant solution was applied directly onto an oxide film of a 4 mm long × 4 mm wide × 0.5 mm thick aluminium foil which was etched by means of hydrochloric acid.

Then, a capacitor of the type as shown in FIG. 2 was constructed by the use of the resultant aluminium electrode as an anode. The capacitor was tested for determining various electric characteristics.

The above process and tests were repeated for comparison except that (quinolinium)$^+$(TCNQ)$^-$(TCNQ) was used instead of (N-iso-propyl quinolinium)$^+$(TCNQ)$^-$(TCNS).

Test results are shown in Table 4 below.

Table 4

| Kind of Charge Transfer Complex<br>Test Item | (Quinolinium)$^+$ (TCNQ)$^-$(TCNQ) | (N-iso-propyl Quinolinium)$^+$ (TCNQ)$^-$(TCNQ) |
|---|---|---|
| Capacitance (25°C) | 0.5 ($\mu$F) | 0.5 ($\mu$F) |
| Frequency Characteristic | 400 KHz | 400 KHz |
| CR Temperature Characteristic (−70°C − 80°C) | 35 Capacitance Changed by 10% | 45 Capacitance Changed by 12% |
| 100°C 500 hrs. | CR increases 100 times as high as the initial CR | CR hardly changes |

It is clear from Table 4 that the use of (N-iso-propyl quinolinium)$^+$(TCNQ)$^-$(TCNQ) remarkably improves high temperature characteristics.

EXAMPLE 5

Example 4 was repeated except that (N-iso-propyl quinolinium)$^+$(TCNQ)$^-_{1.0}$(TCNQ)$_{1.2}$ of Example 2 was used instead of the normal salt of (N-iso-propyl quinolinium)$^+$(TCNQ)$^-$(TCNQ) and polyvinylpyrrolidone instead of polyacrilonitrile, and methanol was used as a solvent.

Similarly, another capacitor was formed using known (quinolinium)$^+$(TCNQ)$^-$(TCNQ) in combination with polyvinylpyrrolidone for comparative purpose.

Characteristics of the capacitors are shown in Table 5.

Table 5

| Kind of Charge Transfer Complex<br>Test Item | (Quinolinium)$^+$ (TCNQ)$^-$(TCNQ) | (N-iso-propyl Quinolinium)$^+$ (TCNQ)$^-$(TCNQ)$_{1.2}$ |
|---|---|---|
| Capacitance (25°C) | 0.6 ($\mu$F) | 0.6 ($\mu$F) |
| Frequency Characteristic | 2 MHz | 2 MHz |
| CR Temperature Characteristic (−70°C − 80°C) | 40 Capacitance Changed by 10% | 55 Capacitance Changed by 10% |
| Thermal treatment 100°C 500 hrs | CR increases 50 times as high as initial CR | CR Changed by 10% |

The capacitor using (N-iso-propyl quinolinium)$^+$(TCNQ)$^-$(TCNQ)$_{1.2}$ hardly changes in capacitance at temperatures of 0° to 130° C.

From the above description, it will be understood that the solid electrolytes which contain a charge transfer complex composed of TCNQ and a nitrogen-containing heterocrocyclic compound having an N-substituted alkyl, alkylene or cycloalkyl group are excellent in thermal stability, electric conductivities, and an ability of reforming an oxide film deposited on an anode, when compared with known TCNQ-base charge transfer complexes. Moreover, when a TCNQ-base abnormal complex salt which contains neutral TCNQ in an amount deviated from 1 mole per mole of the complex salt is used as an electrolyte, electric characteristics of the electrolyte scarcely changes depending upon temperatures.

It will be understood that numerous modifications and variations may be made by those skilled in the art without departing from the scope of the invention. Therefore, the appended claims are intended to cover all such equivalent variations as come within true spirit and scope of the invention.

What is claimed is:

1. An electrolytic capacitor having improved thermal stability comprising a pair of electrodes, at least one of said electrodes being composed of a film-forming metal having a dielectric film thereon, and a solid electrolyte comprising a charge transfer complex composed of 7,7-,8,8-tetracyanoquinodimethane and a nitrogen-containing heterocyclic compound, said complex having at N-position of the heterocyclic compound a substituent group selected from an alkyl group containing from one to 18 carbon atoms, and a cycloalkyl group containing five to eight carbon atoms.

2. A solid electrolytic capacitor as claimed in claim 1, wherein said complex is a normal one which contains 1 mole of neutral 7,7,8,8-tetracyanoquinodimethane per mole of said complex.

3. A solid electrolytic capacitor as claimed in claim 1, wherein said complex salt is an abnormal one which contains neutral 7,7,8,8-tetracyanoquinodimethane in a molar number deviated from 1 per mole of said complex salt.

4. A solid electrolytic capacitor as claimed in claim 3, wherein said abnormal complex salt is selected from the group consisting of
   (N-methyl quinolinium)$^+$(TCNQ)$^-$(TCNQ)$_{0.6}$,
   (N-ethyl quinolinium)$^+$(TCNQ)$^-$(TCNQ)$_{0.8}$,
   (N-n-propyl quinolinium)$^+$(TCNQ)$^-$(TCNQ)$_{0.9}$,
   (N-iso-propyl quinolinium)$^+$(TCNQ)$^-$(TCNQ)$_{1.2}$,
   (N-tert-butyl quinolinium)$^+$(TCNQ)$^-$(TCNQ)$_{2.1}$,
   (N-methyl pyridinium)$^+$(TCNQ)$^-$(TCNQ)$_{1.1}$,
   (N-ethyl pyridinium)$^+$(TCNQ)$^-$(TCNQ)$_{0.9}$,
   (N-n-propyl pyridinium)$^+$(TCNQ)$^-$(TCNQ)$_{1.6}$, and
   (N-tert-butyl pyridinium)$^+$(TCNQ)$^-$(TCNQ)$_{1.2}$.

5. A solid electrolytic capacitor as claimed in claim 1, wherein said nitrogen-containing heterocyclic compound is selected from the group consisting of quinoline and pyridine.

6. A solid electrolytic capacitor as claimed in claim 1, further comprising a polymer which is mixed with said charge transfer complex in an amount of 1 to 20 percent by weight of said transfer complex.

7. A solid electrolytic capacitor as claimed in claim 6, wherein said polymer is selected from the group consisting of 6-nylon, polyvinylpyrrolidone, cellulose derivatives, polyvinylacetate, polyvinylchloride, polyurethane, polymethylmethacrylate, polybutadiene, polychloroprene, polyacrilonitrile, polymethacrylonitrile, polyvinylpyridien, and copolymers of acrilonitrile, methacrylonitrile, and vinylpyridine with each other or with other polymerizable monomers.

* * * * *